US009953747B2

(12) United States Patent
Dolan et al.

(10) Patent No.: US 9,953,747 B2
(45) Date of Patent: Apr. 24, 2018

(54) ELECTROCERAMIC COATING OF A WIRE FOR USE IN A BUNDLED POWER TRANSMISSION CABLE

(71) Applicant: Henkel AG & Co. KGaA, Duesseldorf, DE (US)

(72) Inventors: Shawn E. Dolan, Sterling Heights, MI (US); Mark W. Ziehm, Oakland Township, MI (US); Eric C. Kuhns, Clinton Township, MI (US); Michael Lombardo, Jr., Harrison Township, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/425,123

(22) Filed: Feb. 6, 2017

(65) Prior Publication Data
US 2017/0148548 A1 May 25, 2017

Related U.S. Application Data

(63) Continuation of application No. PCT/US2015/044114, filed on Aug. 7, 2015.
(Continued)

(51) Int. Cl.
*H01B 7/42* (2006.01)
*H01B 3/10* (2006.01)
(Continued)

(52) U.S. Cl.
CPC .............. *H01B 7/421* (2013.01); *H01B 1/023* (2013.01); *H01B 3/105* (2013.01); *H01B 9/006* (2013.01)

(58) Field of Classification Search
CPC .......... H01B 7/29; H01B 13/30; H01B 3/008; H01B 3/10; H01B 5/002; H01B 3/02; H01B 3/46; H01B 7/421
(Continued)

(56) References Cited

U.S. PATENT DOCUMENTS 2,509,894 A * 5/1950 Toulmin, Jr. ........... D07B 1/068
106/623
2,700,212 A 1/1955 Flynn et al.
(Continued)

FOREIGN PATENT DOCUMENTS

CN 103413632 A 11/2013
DE 3824608 C1 8/1989
(Continued)

OTHER PUBLICATIONS

International Search Report for PCT/US2015/044114 dated Nov. 26, 2015, 1 page.
(Continued)

*Primary Examiner* — Timothy Thompson
*Assistant Examiner* — Michael F McAllister
(74) *Attorney, Agent, or Firm* — Mary K. Cameron (57) ABSTRACT

A cable for power distribution applications includes a plurality of wires bundled into the cable. The plurality of wires typically is comprised of interior wires and peripheral wires with the peripheral wires surrounding the interior wires. At least one wire is coated with a high emissivity coating that includes at least 10 weight percent aluminum oxide and a metal oxide other than aluminum oxide. Characteristically, the wire coated with the high emissivity coating has an emissivity greater than about 0.5 in the infrared region of the electromagnetic spectrum and a surface area at least 50 times greater than the surface area of a bare wire prior to being coated with the high emissivity coating.

26 Claims, 3 Drawing Sheets

Related U.S. Application Data (60) Provisional application No. 62/034,358, filed on Aug. 7, 2014, provisional application No. 62/034,308, filed on Aug. 7, 2014.

(51) Int. Cl.
*H01B 1/02* (2006.01)
*H01B 9/00* (2006.01)

(58) Field of Classification Search
USPC .................................................... 174/113 R
See application file for complete search history.

(56) References Cited

U.S. PATENT DOCUMENTS

| | | | |
|---|---|---|---|
| 3,963,857 A | 6/1976 | Reynolds et al. |
| 4,216,263 A | 8/1980 | Otis et al. |
| 4,251,330 A | 2/1981 | Sheasby et al. |
| 4,272,310 A | 6/1981 | Dudgeon |
| 4,340,829 A | 7/1982 | McCoy |
| 4,379,807 A | 4/1983 | Otis et al. |
| 4,391,848 A | 7/1983 | Hilker |
| 4,393,809 A | 7/1983 | Hilker |
| 4,394,417 A | 7/1983 | Hilker |
| 4,470,884 A | 9/1984 | Carr |
| 4,476,407 A | 10/1984 | Hildebrandt et al. |
| 4,489,130 A | 12/1984 | Hilker |
| 4,493,873 A | 1/1985 | Keane et al. |
| 4,521,173 A | 6/1985 | Hilker et al. |
| 4,585,964 A | 4/1986 | Hildebrandt |
| 4,687,898 A | 8/1987 | Riordan et al. |
| 4,725,458 A | 2/1988 | Harber |
| 4,775,726 A | 10/1988 | Lavallee |
| 4,808,436 A | 2/1989 | Lavallee |
| 4,808,477 A | 2/1989 | Harber |
| 4,826,706 A | 5/1989 | Hilker et al. |
| 4,959,577 A | 9/1990 | Radomski |
| 4,978,432 A | 12/1990 | Schmeling et al. |
| 5,025,735 A | 6/1991 | Chan et al. |
| 5,091,609 A | 2/1992 | Sawada et al. |
| 5,242,571 A | 9/1993 | Sein et al. |
| 5,254,806 A | 10/1993 | Gross et al. |
| 5,264,113 A | 11/1993 | Bartak et al. |
| 5,281,282 A | 1/1994 | Dolan et al. |
| 5,337,941 A | 8/1994 | Higashiura et al. |
| 5,372,886 A | 12/1994 | Inazawa et al. |
| 5,427,632 A | 6/1995 | Dolan |
| 5,449,414 A | 9/1995 | Dolan |
| 5,463,804 A | 11/1995 | McCleary et al. |
| 5,468,557 A | 11/1995 | Nishio et al. |
| 5,475,973 A * | 12/1995 | Furukawa ............ D07B 1/0673 57/211 |
| 5,498,296 A | 3/1996 | Sawada et al. |
| 5,534,082 A | 7/1996 | Dollman et al. |
| 5,654,095 A | 8/1997 | Yin et al. |
| 5,683,522 A | 11/1997 | Joesten |
| 5,774,036 A | 6/1998 | Hrytzak et al. |
| 5,845,387 A | 12/1998 | Bonnett et al. |
| 5,861,578 A | 1/1999 | Hake et al. |
| 6,056,995 A | 5/2000 | Hake et al. |
| 6,167,609 B1 | 1/2001 | Marinelli et al. |
| 6,190,770 B1 | 2/2001 | Jang et al. |
| 6,261,437 B1 | 7/2001 | Hernnaes et al. |
| 6,279,850 B1 | 8/2001 | Berggren et al. |
| 6,315,823 B1 | 11/2001 | Dolan |
| 6,357,688 B1 | 3/2002 | Backlund et al. |
| 6,369,470 B1 | 4/2002 | Kylaner et al. |
| 6,376,775 B1 | 4/2002 | Leijon et al. |
| 6,396,187 B1 | 5/2002 | Rothman |
| 6,417,456 B1 | 7/2002 | Leijon et al. |
| 6,429,563 B1 | 8/2002 | Rothman et al. |
| 6,439,497 B1 | 8/2002 | Backlund et al. |
| 6,465,979 B1 | 10/2002 | Leijon et al. |
| 6,525,504 B1 | 2/2003 | Nygren et al. |
| 6,646,363 B2 | 11/2003 | Kylander et al. |
| 6,649,843 B2 | 11/2003 | Aoyama et al. |
| 6,676,820 B2 | 1/2004 | Emmonds et al. |
| 6,797,147 B2 | 9/2004 | Dolan |
| 6,801,421 B1 | 10/2004 | Sasse et al. |
| 6,822,363 B2 | 11/2004 | Leijon et al. |
| 6,825,585 B1 | 11/2004 | Kalldin et al. |
| 6,831,388 B2 | 12/2004 | Leijon et al. |
| 6,873,080 B1 | 3/2005 | Leijon et al. |
| 6,885,273 B2 | 4/2005 | Min et al. |
| 6,891,303 B2 | 5/2005 | Leijon et al. |
| 6,894,416 B2 | 5/2005 | Leijon et al. |
| 6,906,447 B2 | 6/2005 | Leijon et al. |
| 6,914,093 B2 | 7/2005 | Xu |
| 6,916,414 B2 | 7/2005 | Dolan |
| 6,919,664 B2 | 7/2005 | Leijon et al. |
| 6,936,947 B1 | 8/2005 | Leijon et al. |
| 6,940,380 B1 | 9/2005 | Leijon |
| 6,970,063 B1 | 11/2005 | Fromm et al. |
| 6,972,505 B1 | 12/2005 | Leijon et al. |
| 6,995,646 B1 | 2/2006 | Fromm et al. |
| 7,012,195 B2 | 3/2006 | Zettel et al. |
| 7,019,429 B1 | 3/2006 | Larsson et al. |
| 7,045,704 B2 | 5/2006 | Areskoug |
| 7,046,492 B2 | 5/2006 | Fromm et al. |
| 7,061,133 B1 | 6/2006 | Leijon et al. |
| 7,105,047 B2 * | 9/2006 | Simmons ................ C04B 28/00 106/600 |
| 7,125,604 B2 | 10/2006 | Depaola et al. |
| 7,141,908 B2 | 11/2006 | Holmstrom et al. |
| 7,215,048 B2 | 5/2007 | Du et al. |
| 7,289,012 B2 | 10/2007 | Tran-Ngoc et al. |
| 7,319,196 B2 | 1/2008 | LeFranc et al. |
| 7,452,454 B2 | 11/2008 | Dolan |
| 7,464,455 B2 | 12/2008 | Du et al. |
| 7,569,132 B2 | 8/2009 | Dolan |
| 7,569,285 B2 | 8/2009 | Schwartz et al. |
| 7,572,980 B2 | 8/2009 | Elie et al. |
| 7,578,921 B2 | 8/2009 | Dolan |
| 7,595,451 B2 | 9/2009 | Kircanski et al. |
| 7,784,165 B2 | 8/2010 | Xiao et al. |
| 7,815,963 B2 | 10/2010 | Schwartz et al. |
| 7,820,300 B2 | 10/2010 | Dolan |
| 7,825,550 B2 | 11/2010 | Yamada et al. |
| 7,879,456 B2 | 2/2011 | Schwartz et al. |
| 7,883,738 B2 | 2/2011 | Abys et al. |
| 7,932,468 B2 | 4/2011 | Takano et al. |
| 7,935,885 B2 | 5/2011 | Elie et al. |
| 7,972,655 B2 | 7/2011 | Abys et al. |
| 7,973,122 B2 | 7/2011 | Xu |
| 8,092,585 B2 | 1/2012 | Schwartz et al. |
| 8,193,451 B2 | 6/2012 | Kikuchi et al. |
| 8,216,645 B2 | 7/2012 | Abys et al. |
| 8,220,409 B2 | 7/2012 | Goto |
| 8,225,851 B2 | 7/2012 | Ohwaki et al. |
| 8,258,403 B2 | 9/2012 | Honda et al. |
| 8,323,741 B2 | 12/2012 | Abys et al. |
| 8,377,561 B2 | 2/2013 | Binder et al. |
| 8,466,251 B2 | 6/2013 | Kikuchi et al. |
| 8,466,767 B2 | 6/2013 | Piascik et al. |
| 8,572,838 B2 | 11/2013 | Piascik et al. |
| 8,621,897 B2 | 1/2014 | Lee et al. |
| 8,668,985 B2 | 3/2014 | Ohwaki et al. |
| 8,704,416 B2 | 4/2014 | Rumbaugh et al. |
| 8,741,390 B2 | 6/2014 | Abys et al. |
| 8,747,641 B2 | 6/2014 | Binder et al. |
| 8,752,275 B2 | 6/2014 | Maruyama |
| 8,754,735 B2 | 6/2014 | Piascik et al. |
| 8,758,899 B2 | 6/2014 | Schwartz et al. |
| 8,802,230 B2 | 8/2014 | Wang |
| 8,860,541 B2 | 10/2014 | Piascik et al. |
| 9,595,368 B2 | 3/2017 | Ranganathan et al. |
| 2002/0053461 A1 | 5/2002 | Leijon et al. |
| 2004/0031620 A1 | 2/2004 | Lerchenmueller et al. |
| 2014/0041925 A1 * | 2/2014 | Davis ...................... H01B 7/29 174/40 R |
| 2014/0238867 A1 * | 8/2014 | Ranganathan ......... H01B 7/421 205/250 |
| 2014/0318974 A1 * | 10/2014 | Curran .................. C25D 11/02 205/50 |

(56) References Cited

U.S. PATENT DOCUMENTS

| 2015/0104641 | A1* | 4/2015 | Mhetar | H01B 1/023 |
| | | | | 428/366 |
| 2015/0194240 | A1 | 7/2015 | Ranganathan et al. | |
| 2015/0235739 | A1* | 8/2015 | Davis | H01B 9/008 |
| | | | | 174/40 R |

FOREIGN PATENT DOCUMENTS

| EP | 0605354 A1 | 7/1994 |
| RU | 2030045 C1 | 2/1995 |
| RU | 128386 U1 | 5/2013 |
| RU | 2012149293 A | 5/2014 |
| WO | 2001023646 A1 | 4/2001 |
| WO | 2014025420 A1 | 2/2014 |

OTHER PUBLICATIONS

International Search Report for PCT/US2015/044122 dated Nov. 19, 2015, 1 page.
International Search Report for PCT/US2015/044267 dated Nov. 5, 2015, 1 page.
International Search Report for PCT/US2015/044283 dated Nov. 12, 2015, 1 page.
"Overhead Power Lines: Planning, Design, Construction", F. Kiessling, P.Nefzger, J. F. Nolasco, U. KAlNTZYK, Copyright 2003, Springer-Verlag, Berlin, Heidelberg, 4 pages.

* cited by examiner

ELECTROCERAMIC COATING OF A WIRE FOR USE IN A BUNDLED POWER TRANSMISSION CABLE

CROSS-REFERENCE TO RELATED APPLICATIONS

This application claims the benefit of U.S. provisional application Ser. No. 62/034,358 filed Aug. 7, 2014 and U.S. provisional application Ser. No. 62/034,308 filed Aug. 7, 2014, the disclosures of which are hereby incorporated in its entirety by reference herein.

TECHNICAL FIELD

In at least one aspect, the present invention is related to coated wires for high tension cables.

BACKGROUND

Power transmission and utility distribution systems for electricity include overhead cables carrying electricity at high tension, i.e. greater than 100 kV, etc., for distribution and transmission. Each cable is a bundle of multiple wires. A cable is two or more wires running side by side and bonded, twisted, or braided together to form a single assembly. These wires are often made from or include elemental aluminum metal and/or an aluminum alloy. Desirable performance requirements for cables for overhead power transmission applications include corrosion resistance, environmental endurance (e.g., UV and moisture), resistance to loss of strength at elevated temperatures, creep resistance, as well as relatively high elastic modulus, low density, low coefficient of thermal expansion, high electrical conductivity, and high strength. Even with high conductivity, the wires have some electrical resistance (R), which tends to increase with increasing temperature. As current passes through wires in the cable, resistance of the wires causes loss of some power (P), as heat, according to the formula $P=I^2R$, the greater the current the more heat generated, which in turn increases resistance R.

The aluminum transmission cables are often bare or uncoated, act as conductors of electricity that operate at a high temperature, for example, approximately 60-160 degrees Celsius, and have poor emissivity. The emissivity ($\epsilon$) is the ability of a surface to emit radiation energy compared to an ideal black body whose $\epsilon$ is defined as 1 at, the same temperature. Emissivity is expressed as a ratio of the radiation emitted by the surface to that emitted by the black body (scale is 0 to 1, with lower numbers indicating poorer emissivity. The emissivity of the uncoated aluminum wire and cable in use may be in a range of 0.05-0.10, or the like, leaving significant room for improvement of heat dissipation abilities of the cable. The hot aluminum cable has phonon vibrations that in turn cause additional Joule heating, or resistive heating.

Users of overhead utility transmission cable, e.g. power companies and public utilities, experience large energy losses caused by the cable as the operating temperature of the cable increases because resistivity of conductors generally increases with increasing temperature. This energy loss is estimated to account for billions in expenses annually through loss of generated power as it moves through the grid. For example, a typical loaded cable operates under load at a temperature up to 180 degrees Celsius. The conventional uncoated aluminum overhead utility transmission cables have energy losses through excessive Joule heating as the cable operating temperature increases. The Joule heating losses from an uncoated cable may exceed 25% of the power generated, depending on grid size. Additionally, as the temperature of aluminum cable increases, the cable also sags downward with the force of gravity which may cause a hazard. This sag phenomenon requires increasing strength of the cable, generally by including heavy steel wire in the cable's core, and the use of heavy hardware and towers to hold the wire and secure it at a safe distance to eliminate issues relating to grounding and electrically shorting out the cable. Although overhead power transmission cables including aluminum wires are known, for some applications there is a continuing desire, for example, for improved conduction efficiency.

Conventional bare cable has been previously coated using other coatings such as paints and anodizing etc., see for example WO2014025420, and cathodic plating of a dissimilar metal layer onto a metal wire; however, these coatings were limited in coverage and flexibility, showing cracking and delamination, and did not provide adhesion to the cable such that the coating had a low durability.

SUMMARY

The present invention solves one or more problems of the prior art by providing, in at least one embodiment, a coated wire. The coated wire includes a metal wire and a high emissivity coating disposed over and in direct contact with the metal wire. The high emissivity coating includes at least 10 weight percent aluminum oxide of the total weight of the high emissivity coating and at least one metal oxide other than aluminum oxide. Characteristically, the high emissivity coating has an emissivity greater than or equal to 0.5 in the infrared region of the electromagnetic spectrum and a surface area at least 20 times greater than the surface area of the wire prior to coating.

In another embodiment, a cable for electrical power distribution applications is provided. The cable includes a plurality of wires bundled into the cable. The plurality of wires typically has interior wires and peripheral wires with the peripheral wires surrounding the interior wires. At least one peripheral wire can be coated with a high emissivity coating. The high emissivity coating includes at least 10 weight percent aluminum oxide of the total weight of the high emissivity coating and at least one metal oxide other than aluminum oxide. Characteristically, the high emissivity coating has an emissivity greater than or equal to 0.5 in the infrared region of the electromagnetic spectrum and a surface area at least 20 times greater than the surface area of a bare wire prior to being coated with the high emissivity coating.

In another embodiment, a cable for electrical power distribution applications is provided. The cable includes a plurality of wires bundled into the cable. The plurality of wires typically has interior wires and peripheral wires with the peripheral wires surrounding the interior wires. The peripheral wires are coated with a high emissivity electro-ceramic coating. The high emissivity electro-ceramic coating includes titanium oxide and at least 10 weight percent aluminum oxide of the total weight of the high emissivity coating. Characteristically, the high emissivity coating has an emissivity greater than or equal to 0.5 in the infrared region of the electromagnetic spectrum and a surface area at least 20 times greater than the surface area of a bare wire prior to being coated with the high emissivity coating.

In still another embodiment, a cable for electrical power distribution applications is provided. The cable includes a plurality of wires bundled into the cable. The plurality of wires typically has interior wires and peripheral wires with the peripheral wires surrounding the interior wires. The peripheral wires are coated with a high emissivity electro-ceramic mixed oxide coating. Characteristically, the high emissivity coating has an emissivity greater than or equal to 0.5 in the infrared region of the electromagnetic spectrum and a surface area at least 20 times greater than the surface area of a bare wire prior to being coated with the high emissivity coating.

Various embodiments of the present disclosure have associated, non-limiting advantages. For example, the electro-ceramic coating on the outer stands or wires of the cable provides for increased emissivity of the cable and lower cable operating temperatures. By lowering the cable operating temperature, the losses from the cable incurred by Joule heating are reduced, and the cable sag can be reduced. Also, by operating the cable at a lower temperature, the cable can transmit the same amount of electrical power as an uncoated cable more efficiently, or higher amounts of electrical power at the same operating temperature as the uncoated cable of the same or similar materials and construction.

DETAILED DESCRIPTION

Reference will now be made in detail to compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

Except in the examples, or where otherwise expressly indicated, all numerical quantities in this description indicating amounts of material or conditions of reaction and/or use are to be understood as modified by the word "about" in describing the broadest scope of the invention. Also, unless expressly stated to the contrary: percent, "parts of," and ratio values are by weight; the description of a group or class of materials as suitable for a given purpose in connection with the invention implies that mixtures of any two or more of the members of the group or class are equally suitable; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "homogenous" as used herein refers to a layer which has the same composition throughout. In a refinement, the term refers to a layer that has the same composition on a size scale greater than 100 nm. For examples, a homogenous layer is not a layer having particles dispersed within a binder and in particular, a resinous binder. The term "emissivity" as used herein refers to an average emissivity measured in the infrared region of the spectrum.

Figure 1:
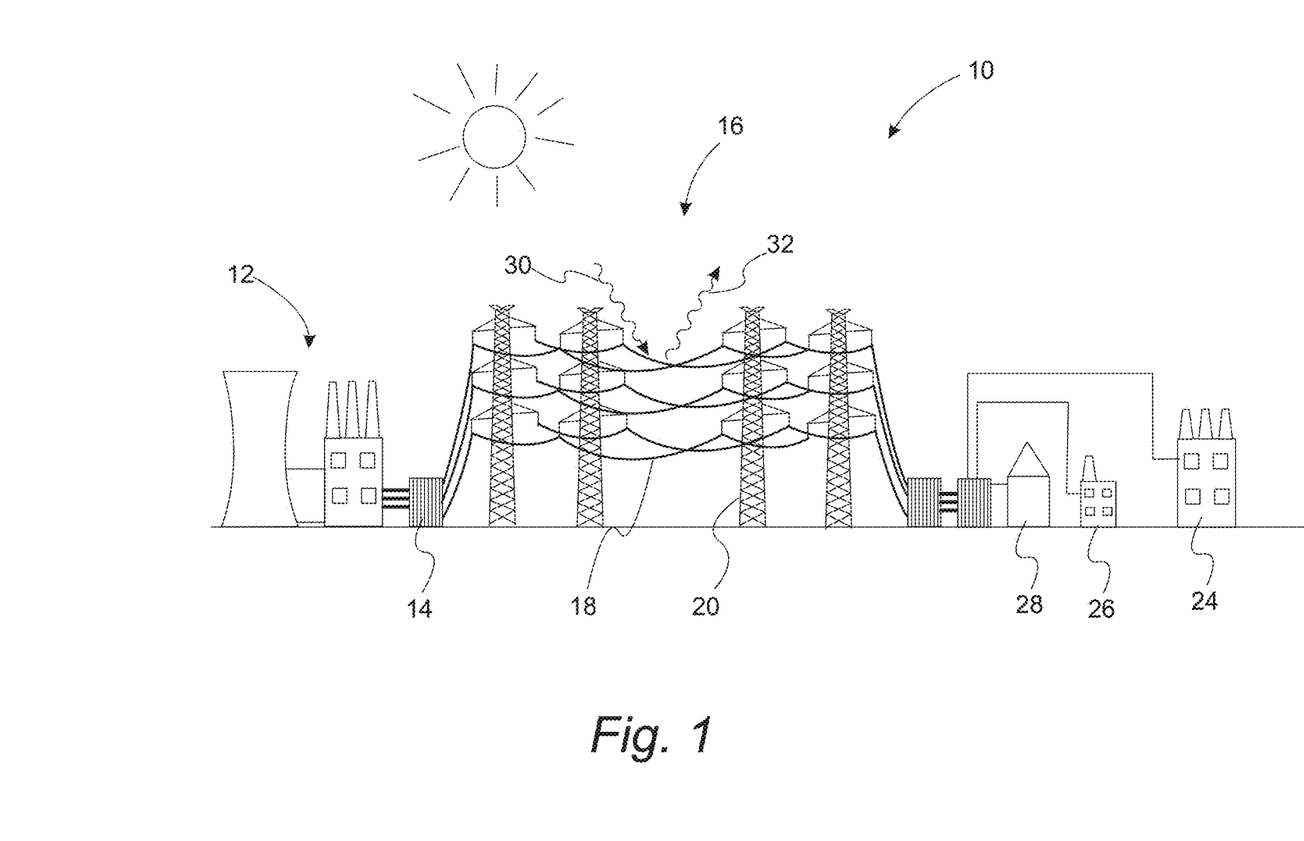
FIG. 1 provides a schematic showing a cable according to an embodiment in use.
Figure 2:
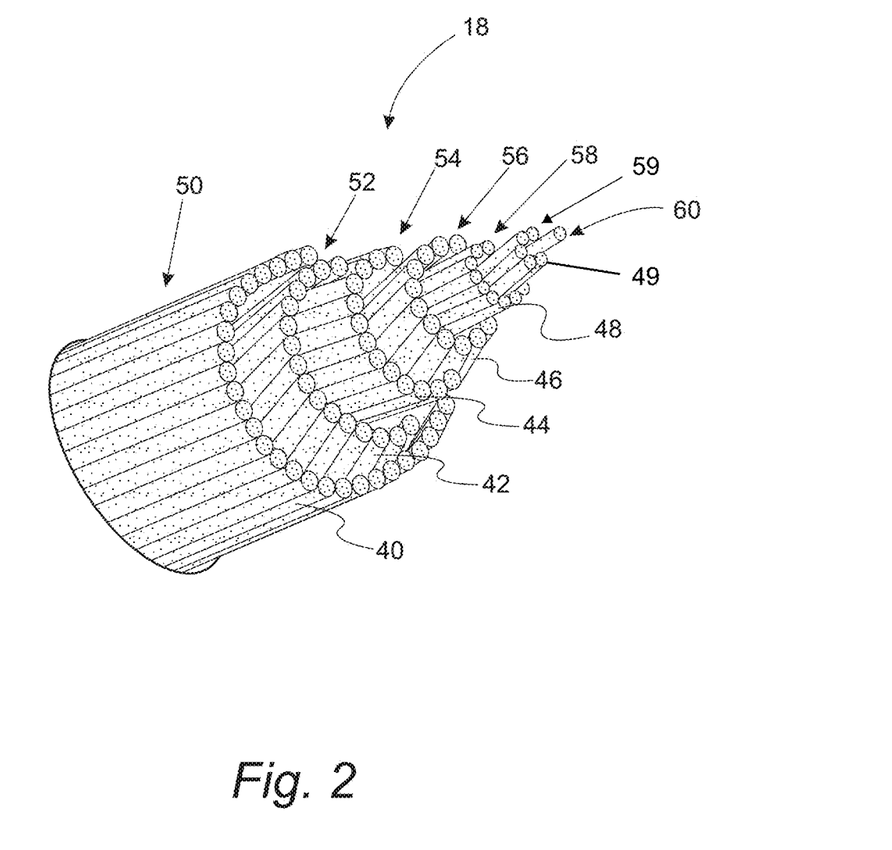
FIG. 2 provides a cutaway view of a section of a cable according to an embodiment.

FIG. 1 illustrates a schematic of an electrical system 10 from generation to point of use. Electricity can be generated at a power station 12, such as a coal-fired plant, a nuclear plant, or the like. Electricity then leaves power station 12 and typically can be directed to a step-up transformer 14. The step-up transformer 14 increases the voltage of the electricity. A power transmission system 16 can be electrically connected to the transformer 14 and includes high tension cables 18. An example of a cable 18 is illustrated in FIG. 2. The power transmission system 16 of FIG. 1 may include both transmission and distribution of electricity in the power grid and operates at various high tensions, i.e. 100 kV, 800 kV, etc. The cables 18 are supported by towers 20. The cables 18 are bundles of conductive wire, such as aluminum, and according to an embodiment, are coated with an emissive material such as a ceramic material having an emissivity in the range of 0.5 to 0.96. Conventional cables are bare or uncoated such that the bare metal surface of the cable can be directly exposed to the environment, and air can be used as the insulating material. The conventional uncoated cables have a low emissivity, on the order of 0.05 to 0.10.

The power transmission system 16 can be connected to one or more step down transformers 22 that lower the voltage of the electricity for use in heavy and light industry 24, 26, commercial, and residential destinations 28.

Generally, energy losses are incurred as the operating temperature of the cable 18 in the system 16 increases. Using conventional cables, the losses in the system 16 and grid may be measured in billions of U.S. dollars. Also, as the operating temperature of the cable increases, the cable may sag or droop. Therefore, conventional cables need to be strengthened. Towers 20 and connecting hardware for the cables are used to hold the cable and secure it at a safe distance to reduce or eliminate issues relating to grounding and shorting out the cable.

As the coated cable 18 is exposed to solar radiation 30, energy can be transferred to the cable 18. The cable also generates an amount of heat based on phonon vibrations and Joule heating. By increasing the emissivity of the cable, the energy lost from the cable via radiation heat transfer and emission 32 can be increased, thereby lowering the overall operating temperature of the coated cable 18 compared to an uncoated cable of the same or similar materials and construction having the same applied load and operating under the same conditions (e.g., weather). The coated cable then maintains a lower temperature under amp loading (current) as well as provides black body radiation to remove heat away from the surface of the wire more effectively than with a lighter colored or bare wire. The conventional loaded cable operates under load at a temperature up to approximately 180 degrees Celsius. A coated cable 18 may operate at the same loading at a temperature up to 30% lower. This allows for the coated cable 18 to either have reduced energy losses or an increase in the amperage that a cable can withstand.

Figure 3:
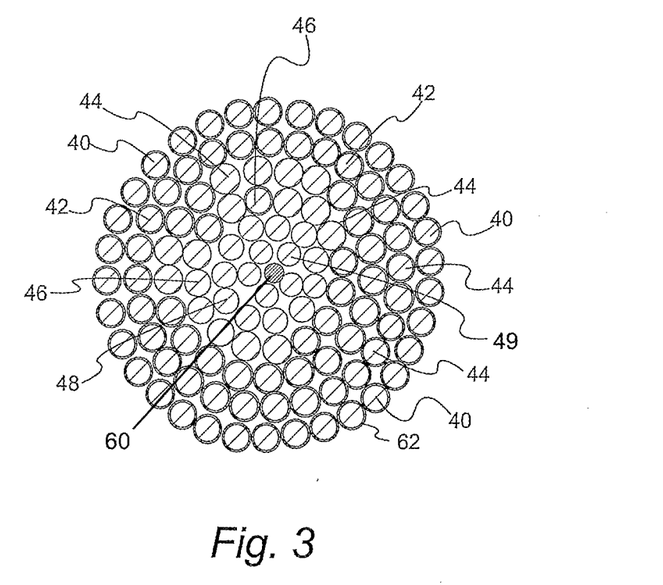
FIG. 3 provides a cross section of the cable depicted in FIG. 2.

With reference to FIGS. 2 and 3, schematic illustrations of a high tension cable having one or more coated wires is provided. High tension cable 18 includes wires or strands 40, 42, 44, 46, 48, 49 arranged respectively in multiple layers 50, 52, 54, 56, 58, 59. In particular, peripheral wires 40 surround first set of interior wires 42 which surrounds second set of interior wires 44. Similarly, second set of interior wires 44 surrounds third set of interior wires 46 which surrounds fourth set of interior wires 48, which surrounds fifth set of interior wires 49. All of the wires 40, 42, 44, 46, 48, 49 in cable 18 may be made of aluminum, an aluminum alloy, or another suitable lightweight conductive material. In an alternative embodiment, as shown, a portion of the wires in the cable, such as central wire 60, may be made of a support material, such as steel, to provide additional strength to the cable. Although the wires 40, 42, 44, 46, 48, 49, 60 are shown as having a circular cross-section, other cross sections may be used as are known in the art, including trapezoidal, and the like. The cable 18 may contain wires 40, 42, 44, 46, 48, 49, 60 having a common diameter, or may contain wires of varying diameters.

Any number of layers may be used with the cable 18 including more or less layers than shown in FIGS. 2 and 3. The terms "center axis" and "center longitudinal axis" are used interchangeably to denote a common longitudinal axis positioned radially at the center of a multilayer stranded cable, running parallel to central wire 60 as shown in FIG. 2. The various sets of wires 40, 42, 44, 46, 48, 49 and the like may run parallel to or at an angle to the center longitudinal axis. The term "lay angle" refers to the angle, formed by a stranded wire of a cable, relative to the center longitudinal axis of the stranded cable. Generally stranded cables include a central wire 60 defining a center longitudinal axis, and sets of wires helically stranded around the central wire. In the embodiment shown in FIG. 2, a first set of wires is helically stranded at a first lay angle defined relative to the center longitudinal axis, and a second set of wires is helically stranded around the first set of wires at a second lay angle defined relative to the center longitudinal axis, and so forth for the remaining sets of wires. Generally, the relative difference between lay angle of a layer of wire and the lay angle of the underlying layer of wire, for example the first lay angle and the second lay angle, is about 10 degrees or less.

As shown in FIG. 3, only some of the wires in a cable may be coated with the high emissivity coating 62. In one variation, at least one of wires 40 can be coated with high emissivity coating 62 (e.g., emissivity greater than or equal to 0.5). In another variation, all of peripheral wires 40 are coated with high emissivity coating 62, as in FIG. 3. In other variations, at least one of interior wires 42, 44, 46, 48 are coated with high emissivity coating 62. In some applications, all of interior wires 42, 44, 46, 48 are coated with high emissivity coating 62.

In a refinement, high emissivity coating 62 comprises at least 10 weight percent aluminum oxide of the total weight of the high emissivity coating and at least one metal oxide that is not aluminum oxide.

In another refinement, high emissivity electro-ceramic coating 62 may include aluminum oxide in an amount of at least, 5 weight percent, 10 weight percent, 15 weight percent, 20 weight percent, 25 weight percent, or 30 weight percent of the total weight of the high emissivity coating and independently may include aluminum oxide in an amount of at most, 80 weight percent, 75 weight percent, 70 weight percent, 60 weight percent, 50 weight percent, or 40 weight percent of the total weight of the high emissivity coating.

In some embodiments, the metal oxide or oxides other than aluminum oxide are present in an amount of at least 10, 15, 20, 25, 30, 35, 40, 45, or 50 weight percent of the total weight of the high emissivity coating. In still another refinement, high emissivity electro-ceramic coating 62 may include, the metal oxide or oxides other than aluminum oxide in an amount of at most 95 weight percent, 90 weight percent, 85 weight percent, 80 weight percent, 75 weight percent, 70 weight percent, 65 weight percent, 60 weight percent, 55 weight percent of the total weight of the high emissivity coating.

The high emissivity electro-ceramic coating is directly, chemically bonded to the wire substrate surface and has an interface with the metal surface. Inclusion of aluminum, at least partially from the metal surface into the high emissivity electro-ceramic coating provides improved adhesion of the coating. In a variation, the aluminum oxide concentration varies over the thickness of the high emissivity electro-ceramic coating, wherein amount of aluminum oxide is greater at the coating substrate interface and generally decreases with increasing distances away from the wire substrate metal surface. For example, the aluminum concentration may be 10 to 50 percent greater at 0.1 microns from the interface than at 3, 5, 7, or 10 microns from the interface.

The inclusion of aluminum oxide advantageously allows the adjustment of coating features, e.g. the color and abrasion resistance of the high emissivity coating. In particular, the addition of aluminum oxide can provide "lighter" colors with higher emissivity ($\epsilon$) values. Moreover, varying the amount of aluminum oxide can provide the ability to vary the emissivity by an amount of at least 10 percent compared to coatings not including aluminum oxide.

Examples of suitable metal oxides other than aluminum oxide include, but are not limited to, oxide coatings that include titanium oxide, zirconium oxide, hafnium oxide, tin oxide, germanium oxide, boron oxide, iron oxides, copper oxides, manganese oxides, cobalt oxides, cerium oxides, molybdenum oxides, tungsten oxides, yttrium oxides, bismuth oxides, zinc oxide, vanadium oxides, or combinations thereof. The oxide coating can advantageously be a homogenous electro-ceramic layer prepared as set forth below in more detail. High emissivity coating 62 may include the aluminum oxide and the metal oxide or oxides other than aluminum oxide in combination in homogeneous form such that the high emissivity electro-ceramic coating can be the same throughout. Alternatively, high emissivity coating 62 may include the aluminum oxide and the other metal oxide combination in a form having domains (e.g., grains or crystallites) of the aluminum oxide and domains of the metal oxide or oxides other than aluminum oxide. The high emissivity electro-ceramic coating may have amorphous and crystalline regions. This variation does not include a binder resin or matrix to hold the oxide mixture. The mixed oxide layer of the present variation can be advantageously an electro-ceramic layer as set forth below in more detail.

In a variation, high emissivity coating 62 includes an oxide mixture comprise of at least a first oxide and a second oxide. In refinement, the oxide mixture may include high emissivity oxides (e.g., emissivity greater than or equal to 0.5), low emissivity oxides (e.g., emissivity less than 0.5), and combinations thereof. Examples of oxides include the suitable metal oxides other than aluminum oxide as recited above, as well as aluminum oxide and oxides of alloying elements from any aluminum alloy being coated. Typically, the oxide mixture includes from 5, 10, 20, 30, 40, 50, 60, 70, 80, 90 or 95 weight percent of the first oxide and from 95, 90, 80, 70, 60, 50, 40, 30, 20, 10 or 5 weight percent of the second oxide. High emissivity coating 62 may include the oxide mixture in homogeneous form in which the composition can be the same throughout. Alternatively, high emissivity coating 62 may include the oxide mixture in a form having domains (e.g., grains or crystallites) of the first oxide and domains of the second oxide. The high emissivity electro-ceramic coating may have amorphous and crystalline regions. This variation does not include a binder resin or matrix to hold the oxide mixture. The mixed oxide layer of the present variation can be advantageously an electro-ceramic layer as set forth below in more detail.

In a refinement, coating 62 can be in direct contact with the underlying bare aluminum or aluminum alloy wire and can be also exposed to environment. Typically, high emissivity coating 62 has a higher emissivity than the surface of the bare wires, such as aluminum, and may be a different color. By coating peripheral wires 40 in the cable 18, the emissivity of the cable can be advantageously increased. High emissivity coating 62 typically has an emissivity greater than about 0.5 in the infrared region (e.g., from about 2 to 12 micron light wavelength) at temperatures from 25° C. to 200° C. The emissivity can be determined by the protocol set forth in ASTM E1933-99a (2010), the entire disclosure of which is hereby incorporated by reference. In a refinement, high emissivity coating 62 typically has an emissivity from 0.5 to about 0.96 in the infrared region (e.g., from about 2 to 12 micron light wavelength) at temperatures from 25° C. to 200° C. In still another refinement, high emissivity coating 62 typically has an emissivity greater than or equal to 0.5, 0.55, 0.6, 0.65, or 0.75 in the infrared region of the spectrum (e.g., from about 2 to 12 micron light wavelength) at temperatures from 25° C. to 200° C. In yet another refinement, high emissivity coating 62 typically has an emissivity less than or equal to 0.99, 0.95, 0.9, 0.85, or 0.8 in the infrared region of the spectrum (e.g., from about 2 to 12 micron light wavelength) at temperatures from 25° C. to 200° C.

High emissivity coating 62 typically increases wire surface area compared to bare wire surface area. The increased surface area provides for increased radiative emission from the cable, as well as improved convective cooling. In this regard, high emissivity coating 62 may have a surface area from 10 and 250 times greater than the surface area of a bare wire (e.g. aluminum or aluminum alloy) before being coated with the high emissivity coating. In a refinement, high emissivity coating 60 may have a surface area at least 100 times greater than the surface area of a bare wire before being coated with the high emissivity coating. The surface area can be determined by the BET method which is set forth for example by ASTM C1274-12; the entire disclosure of which is hereby incorporated by reference. In other refinements, high emissivity coating 62 typically has a surface area that is about 10, 20, 30, 40, 50, 60, 70, 80, 90, 100, 120, 130, 140, 150, 170, or 200 times greater than the surface area of the underlying coated wire, e.g. than that of a bare wire. In a further refinement, high emissivity coating 62 has a surface area between 100 to 1000 times greater than the surface area of the underlying coated wire, e.g. than that of a bare wire. In yet other refinements, high emissivity coating 62 typically has a surface area less than 1000, 700, 500, 400, 350, 300, 250, or 225 times greater than the surface area of the underlying coated wire, e.g. than that of a bare wire. High emissivity coating 62 may have a surface area that is about 10, 20, 30, 40, 50, 60, 70, 80, 90, 100, 120, 130, 140, 150, 170, or 200 times greater than the surface area of the underlying coated wire and less than 1000, 700, 500, 400, 350, 300, 250, or 225 times greater than the surface area of the underlying coated wire. In another refinement, high emissivity coating 62 has a surface area that is about 700 times greater than the surface area of the underlying coated wire, e.g. than that of a bare wire.

According to one example, high emissivity coating 62 increases the specific surface area of a wire by one to two orders of magnitude, i.e. ten times or one hundred times, or the like. In a further example, the specific surface area can be 140 to 700 times the cross sectional area, and has a weight of 800 mg per square foot. In another example, the specific surface area of the high emissivity coating 62 can be in the range of 100-1000 times the cross sectional area, and in a further example is 700 times the cross sectional area. A specific surface area is the total surface area per unit mass ($m^2/g$). A cable having at least its peripheral wires coated with the high emissivity electro-ceramic coating may operate at about a 40-80 degrees Celsius lower temperature than a similar cable in the absence of the high emissivity electro-ceramic coating. These cables operating under electric load at a temperature up to approximately 160 degrees Celsius. The coated cable may operate up to 20%-30% lower in temperature than a similar cable in the absence of the high emissivity electro-ceramic coating based on the same load which allows for either reduced energy losses of the coated cable, or the ability to increase the current carrying capability of a given cable for a given temperature.

High emissivity coating 62 can be useful in cooling the wires by reducing the phonon vibrations thereby providing a reduction in overall joule heating. This may effectively save on the order of tens of thousands of dollars in wasted electricity per installed mile of high tension cable per year. Alternatively, the coated cable may be operated at higher current levels than a conventional cable at the same operating temperature, thereby providing for increased power transmission and the ability to effectively increase the maximum power throughput of the cable and grid. The high emissivity electro-ceramic coatings are typically stable in ultraviolet (UV) light to withstand exposure to the sun. Additionally, the high emissivity coatings may be scratch resistant, and may be able to bend with the cable 18 or the coated wires without delaminating, cracking or breaking. The high emissivity coatings are sufficiently thin such that they do not significantly increase the overall weight of the cable. In one example, the high emissivity coatings are generally at least about 1, 3, 5, 7, 9, 10, 11, or 12 microns in thickness, and are generally not more than about 25, 20, 28, 16, 15, 14, or 13 microns in thickness. In some examples, the high emissivity coatings increase the mass of the substrate from 4 to 20 $g/m^2$, depending on thickness and chemical composition.

The high emissivity coatings described herein may also be described by color. In a refinement, CIELAB color space measurements using a Minolta CR-300 series provide the following color information: titanium oxide-based coating samples have (L, A, b) values of (46.62+/−20%, −4.99+/−20%, +0.13+/−20%), while samples of a zirconia containing coating have (L, A, b) values of (88.95+/−20%, −8.71+/−20%, +6.09+/−20%).

High emissivity coating 62 can be typically a uniform coating having a constant or generally constant thickness about the perimeter of the outer layer wire 46. Desirably, this uniformity is achieved in the absence of a polishing, grinding or other removal of coating. In one embodiment, thickness may vary by 0 to 25%, for example at least 1, 3, 5, 7, 9 or 10%, and desirably no more than 25, 20, 18, 16, 14, or 12%, with higher tolerances being acceptable with thicker coatings. The high emissivity electro-ceramic coating provides for improved emissivity, surface area and heat transfer compared to a bare wire. The coating 48 on the wire has been demonstrated to pass a T-bend test of 0T-1T showing a high bend strength and high adhesion to the wire to provide flexibility under weathering conditions and subjected forces during use. In one example, the emissivity of the coating ranges from about 0.5, 0.6 to 1.00, and in a further example, the emissivity is from 0.6 to 0.96.

In one variation, a high emissivity coating 62 may be applied to aluminum outer layer wires 42 that would normally be bare or uncoated on a high tension transmission line or cable 18 operating at approximately at 100-1000 kV. Enhanced emissivity, enhanced surface area, UV stability, and good thermal conductivity are desirable characteristics provided by the coating 62.

Note that high emissivity with low solar absorption (less than 20 percent solar absorption) may be useful in many high tension electrical transmission application areas. The shade or color of the coating may be varied, for example, by various shades of grey ranging from white to black, with lighter shades of grey providing lower absorption of solar emissions. Darker shades of grey may be used to help the cable shed ice, for example.

Figure 4:
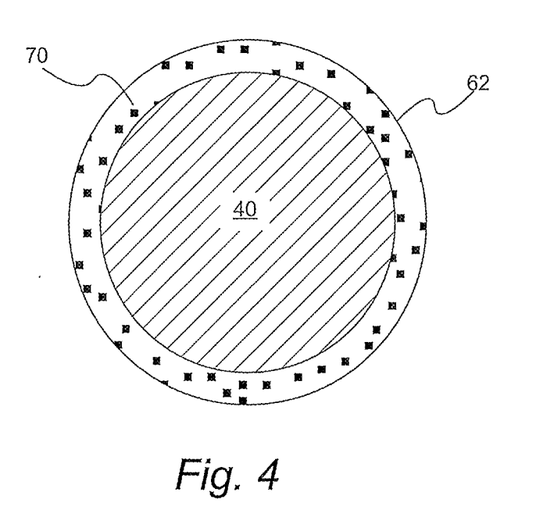
FIG. 4 provides a cross section of a wire over-coated with a porous high emissivity coating.

With reference to FIG. 4, a cross section of a wire depicting coating 62 and a plurality of pores 70 is provided. Typically, high emissivity coating 62 can be an electro-ceramic coating. These pores 70 define at least in part the increased surface area of coated wire as set forth above. It should also be appreciated that since wind is useful in cooling electrical transmission cable, in the embodiments of the high emissivity coating set forth above, pores advantageously increase wind cooling by increasing cable surface area. In an additional variation, high emissivity particles, e.g. carbon, such as carbon black, lamp black, graphite, graphene, graphene oxide; copper sulfide, MnO and the like, can be physically incorporated into the pores of the high emissivity coatings by contact therewith, such as burnishing, shot blasting and the like. In one variation, carbon particles (e.g., graphite) are embedded into the pores 70 in coating 62 by abrasively contacting the coating with graphite particles.

In an alternative variation, the outer surfaces of 40, 42, 44, 46, 48 are roughened prior to application of high emissivity coating 62. Mechanical roughening by such processes as knurling or rifling increase the surface area of a bare wire, desirably by at least about 5 to 30 percent or more. Such roughening increases the surface area of the coating to improve heat transfer. It should also be appreciated that rifling and knurling, high emissivity coatings applied to these roughened surfaces follows the profile of the knurling rather than filling in the roughness as is typical of a resin binder or paint. In addition, secondary heat transfer fins such as spine fins, or fins that have a high surface area and are an adhesively bonded auxiliary fin, may be adhesively bonded to the cable 18 or outer layer wire 46 for additional surface area enhancement. These secondary heat transfer fins may also be coated. This latter variation regarding secondary heat transfer fins is useful for retrofitting cable already in use. Moreover, in another variation, the wires coated with the high emissivity coating set forth above can be wound around congenital cables to transfer heat from the cable by effectively increasing the cables surface area.

As set forth above, one or more of wires 40, 42, 44, 46, 48 includes a high surface area, high emissivity coating disposed over their surfaces. It has been found that such high surface areas, high emissivity coatings are advantageous electro-ceramic coatings. In particular, these coatings may be prepared by the processes set forth in U.S. Pat. Nos. 6,797,147; 6,916,414 and 7,578,921; the entire disclosures of which are hereby incorporated by reference. In general, the high emissivity coatings are formed by a method in which a bare wire can be contacted with a bath containing an aqueous solution with a precursor for the electro-ceramic coating. The bare wire is electrified with a high voltage and a high current; and electrochemically reacts with the precursor in the bath to provide the high emissivity coating on an outer surface of the wire. As used herein "high voltage" used in the coating apparatus and process includes peak voltage potential of at least about 140 volts up to about 800 volts; "high current" as used herein includes effective current of at least about 20 amps and up to about 1000 amps per wire. These values may be varied while practicing the continuous coating process within power applied ranges of at least 10, 20, 30, 40 or 50 kW per wire. Greater kW may be applied to a wire provided the wire has great enough cross-sectional area to withstand the added kW without damage to the wire.

Direct current and/or alternating current can be used. In some embodiments, the current may be a square wave form pattern with a frequency of 0.01-40 milliseconds. Frequency may be adjusted from 25Hz to 25,000 Hz, may be high frequency such as 200-25,000 Hz or 100-10,000 Hz. Waveforms may include sinusoidal, triangular, and/or rectangular in any of AC, DC or pulsed DC current, as well as complex waveforms containing superimposed waveforms, e.g. an AC waveform over a DC waveform.

High current is an effective current at or greater than about 20-1000 Amps per wire. As wire size increases so does current carrying capability without damage to the wire. Too much current through a wire may result in excessive heating of the wire, resulting in embrittlement of the wire. Depending upon the gage of wire to be coated the amperage may be adjusted to at least 20, 30, 40, 50, 60, 70, 80, 90, or 100 Amps and preferably not more than 1000, 800, 600, 400, 300, 200 180, 160, 140, 120 Amps per wire, i.e. a single strand of wire, for high tension wire. Applied current may be alternating current, asymmetric alternating current, direct current, or pulsed direct current. In some examples, direct current is used and may be applied as an on/off waveform. In one embodiment, a total period of the waveform is at least 0.01, 0.1, 1 or 10 milliseconds and up to 50, 40, 30, 20 or 15 milliseconds. Waveforms may be adjusted to a ratio of at least: 0.1, 0.3, 0.6, 1.0, 1.2, 1.5, 1.7, 2.0, 2.2, 2.5, 2.8, 3.0, 5.0, 10.0, or up to an infinite ratio where the direct current is always on and there is no off portion, also referred to as straight DC.

Generally, residence time ranges from about 1, 2, 3, 4, 5, 6, 8, or 10 seconds and at least for efficiency is not more than 180, 160, 140, 120, 100, 60, 45, 30, 20 or 15 seconds. In one example, the residence time is approximately five to ten seconds. Generally, feed rate or wire speed is dependent upon achieving sufficient residence time for desired coating properties, e.g. thickness, surface area and emissivity, and desirably can range from about 10 feet per minute to about 200 feet per minute. Higher speeds may be used provided that residence time is maintained.

In another embodiment, the emissivity of the coating is modified by changes in the identity of the electroceramic coating precursors in the electrolytic bath, e.g. precursor elements may include Ti, Zr, Zn, Hf, Sn, B, Al, Ge, Fe, Cu, Ce, Y, Bi, P, V, Nb, Mo, Mn, W and Co. In one embodiment, features of the coating are adjusted by changing aluminum and/or zirconium concentration of the aqueous solution. The inclusion of aluminum oxide and/or zirconium oxide advantageously allows the adjustment of coating features, e.g. the color and/or abrasion resistance of the high emissivity coating. The chemical precursors used for forming the high emissivity coating are preferably free of the following chemicals: chromium, cyanide, nitrite ions, oxalates; carbonates; silicon, e.g. siloxanes, organosiloxanes, silanes, silicate; hydroxylamines, sodium and sulfur. Specifically, it is increasingly preferred in the order given, independently for each preferably minimized component listed below, that precursor for the electro-ceramic coating according to the invention, when directly contacted with metal in a process according to this invention, contain no more than 1.0, 0.35, 0.10, 0.08, 0.04, 0.02, 0.01, 0.001, or 0.0002 percent of each of the following constituents: chromium, cyanide, nitrite ions; oxalates; carbonates; silicon, e.g. siloxanes, organosiloxanes, silanes, silicate; hydroxylamines, sodium and sulfur.

The aluminum or aluminum alloy wire used in the cable 18 may be continuously coated with an electro-ceramic or other high emissivity UV stable coating. The coating may be applied on at least one or more of the most exterior set of wires surrounding a center core of wires in order to lower the overall operating temperature of an energized cable. The coating may be applied during a continuous process to individual wires before the wires are bundled into the cable. In one example, the outermost layer wires 40 in the cable 18 are coated prior to the bundling process to form the finished cable 18. The outer layer wires 40 are singly coated and then placed as the outer wires on the cable 18, thereby only coating the wires 40 that directly benefit from having a low emissivity coating on them, i.e. the wires exposed to the external environment. Alternatively, the entire cable may be coated; while this aspect may provide only minor improvement in cable efficiency or operating temperature, coating an entire cable may be desirable for retrofit or other purposes. The high emissivity coating may also allow for reduced sag of a finished cable of same design due to the reduced operating temperature.

The following examples illustrate the various embodiments of the present invention. Those skilled in the art will recognize many variations that are within the spirit of the present invention and scope of the claims.

EXAMPLES

Example 1

An aluminum alloy sample was coated in an aqueous electrolytic deposition bath comprising 5.24 parts zirconium basic carbonate and 20.06 parts hexafluorozirconic acid, at constant temperature and 410 Volts peak for 3 minutes. A DC pulsed square waveform having an on/off ratio of 1:3 was used. The coated sample was removed from the bath, rinsed with water and allowed to dry. Emissivity of the sample was 0.68 at 3.1 microns thickness.

Example 2

An aluminum alloy sample was coated in an aqueous solution comprising 1 part hexafluorotitanic acid and 1 part hexafluorozirconic acid to 0.375 parts of a source of phosphate, measured as phosphate. The aqueous solution was energized to 450 volts applied at constant temperature for a time sufficient to deposit an electroceramic coating. A DC pulsed square waveform having an on/off ratio of 2.78 was used. The coated sample was removed from the bath, rinsed with water and allowed to dry. Emissivity of the sample was 0.79 at 9.0 microns.

The foregoing examples illustrate controlling emissivity by altering bath chemistry for electro-ceramic methods of coating wire.

Example 3

Aluminum alloy samples were coated in an electrolytic deposition bath comprising a phosphate source and hexafluorotitanic acid at constant concentration. All samples were coated in the same bath at constant temperature. Voltage, amperage, time and waveforms were varied, as shown below. Waveforms for pulsed DC current were square. The coated samples were removed from the bath, rinsed with water and allowed to dry. Emissivity of the samples was determined for various combinations of voltage, amperage, time and waveforms used, and the results are shown in the table below.

| Variation | Thickness (microns) | Waveform and on/off ratio | Volts | Amps | Time (sec) | Emissivity |
|---|---|---|---|---|---|---|
| 1 | 1.41 | DC on/off ratio 2.78 | 250 | 185 | 12 | 0.41 |
| 2 | 3.03 | DC on/off ratio 2.78 | 290 | 185 | 12 | 0.52 |
| 3 | 3.23 | DC on/off ratio 2.78 | 320 | 185 | 12 | 0.58 |
| 4 | 4.85 | DC on/off ratio 2.78 | 370 | 185 | 12 | 0.6 |
| 5 | 6.32 | DC on/off ratio 2.78 | 410 | 185 | 12 | 0.62 |
| 6 | 7.99 | DC on/off ratio 2.78 | 475 | 185 | 12 | 0.62 |
| 7 | 8.13 | DC on/off ratio 1.71 | 475 | 185 | 12 | 0.61 |
| 8 | 7 | DC on/off ratio 1 | 390 | 185 | 12 | 0.59 |
| 9 | 6.75 | DC on/off ratio 1 | 475 | 185 | 12 | 0.61 |
| 10 | 8.4 | Straight DC | 390 | 147 | 12 | 0.64 |
| 11 | 10.25 | Straight DC | 475 | 147 | 12 | 0.62 |
| 12 | 13.34 | Two step AC | 450 | 185 | 60 | 0.66 |
| 13 | 7.8 | DC on/off ratio 2.78 | 475 | 25 | 60 | 0.62 |
| 14 | 5.35 | DC on/off ratio 2.78 | 475 | 10 | 120 | 0.59 |
| 15 | 3.61 | DC on/off ratio 2.78 | 320 | 185 | 20 | 0.56 |
| 16 | 5.74 | DC on/off ratio 2.78 | 370 | 185 | 20 | 0.62 |
| 17 | 7.66 | DC on/off ratio 2.78 | 410 | 185 | 20 | 0.62 |
| 18 | 10.85 | DC on/off ratio 2.78 | 475 | 185 | 20 | 0.67 |
| 19 | 9.84 | DC on/off ratio 1.71 | 475 | 185 | 20 | 0.65 |
| 20 | 6.24 | DC on/off ratio 1 | 390 | 185 | 20 | 0.6 |
| 21 | 7.89 | DC on/off ratio 1 | 475 | 185 | 20 | 0.62 |
| 22 | 7.03 | Straight DC | 390 | 147 | 20 | 0.63 |
| 23 | 11.18 | Straight DC | 475 | 147 | 20 | 0.68 |

The above results showed that without changing the bath content, the emissivity can be increased by about 40% from the lowest to the highest emissivity shown, by controlling deposition parameters including waveform, voltage, amperage, and contact time.

Example 4

An elemental depth profile was taken of the coatings of Example 3 using glow discharge optical emission spectroscopy (GDOES). Amounts of various elements were determined in weight percent at particular distances from the metal surface. For all samples, oxygen content built gradually from initial values of less than 2 wt. % at the substrate, while the Al content dropped precipitously over a span of about 2 microns independent of coating thickness.

Surface analyte weight percentages were similar across the samples, as shown in the table below:

| Variation | Emissivity | Surface Al (wt. %) | Surface Ti (wt. %) | Surface O (wt. %) | Surface P (wt. %) |
|---|---|---|---|---|---|
| 1 | 0.41 | <10 | ~4 | 50-60 | 4-9 |
| 2 | 0.52 | <10 | ~10 | ~74 | 4-9 |
| 3 | 0.58 | <10 | 15-25 | 50-60 | 4-9 |
| 4 | 0.6 | <10 | 15-25 | 50-60 | 4-9 |
| 5 | 0.62 | <10 | 15-25 | 50-60 | 4-9 |
| 6 | 0.62 | <10 | 15-25 | 50-60 | 4-9 |
| 7 | 0.61 | <10 | 15-25 | 50-60 | 4-9 |
| 8 | 0.59 | <10 | 15-25 | 50-60 | 4-9 |
| 9 | 0.61 | <10 | ~28 | 50-60 | 4-9 |
| 10 | 0.64 | <10 | 15-25 | 50-60 | 4-9 |
| 11 | 0.62 | <10 | 15-25 | 50-60 | 4-9 |
| 12 | 0.66 | <10 | 15-25 | 60-70 | 4-9 |
| 13 | 0.62 | <10 | 15-25 | 60-70 | 4-9 |
| 14 | 0.59 | 10 < x < 15 | 15-25 | 50-60 | 4-9 |
| 15 | 0.56 | <10 | ~4 | 60-70 | 4-9 |
| 16 | 0.62 | <10 | 15-25 | 50-60 | 4-9 |
| 17 | 0.62 | <10 | 15-25 | 50-60 | 4-9 |
| 18 | 0.67 | <10 | 15-25 | 60-70 | 4-9 |
| 19 | 0.65 | <10 | 15-25 | 60-70 | 4-9 |
| 20 | 0.6 | <10 | 15-25 | 50-60 | 4-9 |
| 21 | 0.62 | <10 | 15-25 | 60-70 | 4-9 |
| 22 | 0.63 | <10 | 15-25 | 50-60 | 4-9 |
| 23 | 0.68 | <10 | 15-25 | 60-70 | 4-9 |

Comparing the data from the GDOES analysis of the coatings of Example 3 showed surprising similarities between elemental profiles despite different emissivity values. These results tend to show that coating thickness, waveform of deposition, voltage and amperage work synergistically to produce coatings, that although quite similar elementally, have differing emissivities.

Example 5

Aluminum alloy samples were coated in an electrolytic deposition bath comprising a phosphate source and hexafluorotitanic acid at constant concentration. All samples were coated in the same bath at constant temperature and voltage. Time and waveforms were varied, as shown below. Waveforms for pulsed DC current were square. The coated samples were removed from the bath, rinsed with water and allowed to dry. Emissivity of the samples was determined for various combinations and the results are shown in the table below.

| Variation | Thickness (microns) | Waveform and on/off ratio | Time (sec) | Emissivity |
|---|---|---|---|---|
| 24 | 9.4 | DC on/off ratio 2.78 | 30 | 0.70 |
| 25 | 10 | Straight DC | 30 | 0.71 |
| 26 | 9.4 | DC on/off ratio 1 | 42 | 0.77 |

The above results showed that with bath content and voltage held constant, the emissivity was increased by about 10%, from the lowest to the highest emissivity shown, by controlling waveform and contact time.

Example 6

Sets of commercially available aluminum alloy wires and representative flat panel samples of the aluminum alloys were coated in electrolytic deposition baths comprising a phosphate source and hexafluorotitanic acid at constant concentration. Voltage, power, time and waveforms were varied, as shown below. Waveforms for pulsed DC current were square. The coated samples were removed from their baths, rinsed with water and allowed to dry. Quality and thickness of the coatings were assessed and the results are shown in the table below.

| Variation | Thickness (microns) | Measured feet/minute | Waveform on/off ratio | Volts | Avg. kW during run |
|---|---|---|---|---|---|
| 27 | 7.3 | 10.0 | 1 | 450 | 30 |
| 28 | 6.6 | 34.0 | 1 | 450 | 32 |
| 29 | 8.9 | 22.7 | 2.78 | 450 | 39 |
| 30 | 8.3 | 26 | 2.78 | 450 | 42 |
| 31 | 8.2 | 31 | 2.78 | 475 | 62 |

The emissivity of the representative flat panel sample from the same set, selected to have sufficient flat surface area for taking emissivity readings, was measured. Emissivity of the flat samples was measured to be 0.73±0.03. The above results showed that with bath content held constant, the emissivity can be maintained at a given level by selecting and/or controlling waveform, voltage, power, and contact time (for wire this would generally be distance of travel per unit time through a bath along a path of constant dimension, aka line speed).

Example 7

A series of aluminum alloy samples were electrolytically coated at constant voltage of 435 V with a constant waveform having an on/off ratio of 2.78, using the electrolyte of Example 3 which had been modified by the addition of dissolved Al, in amounts as shown in the table below. The current applied and the coating time were held constant within each alloy group. The coated samples were removed from the electrolyte, rinsed with water and allowed to air dry. The samples in each alloy group were subjected to abrasion testing using a CS-10 grade abrasive wheel under 500 gram load. After 5000 cycles of testing the weight loss and TWI were determined. Average values for both weight loss and TWI are shown below.

| Alloy | Average Weight Loss (mg) | Average TWI | Al added to the coating bath (ppm) |
|---|---|---|---|
| 713 | 8.51 | 1.70 | 10 |
| | 14.66 | 2.93 | 450 |
| | 17.46 | 3.49 | 860 |
| A356 | 9.70 | 1.94 | 10 |
| | 24.95 | 4.99 | 450 |
| | 27.65 | 5.53 | 860 |
| A380 | 7.45 | 1.49 | 10 |
| | 17.65 | 3.53 | 450 |
| | 17.50 | 3.50 | 860 |
| 2024 | 14.10 | 2.82 | 10 |
| | 22.30 | 4.46 | 450 |
| | 24.20 | 4.84 | 860 |
| 6061 | 16.35 | 3.27 | 10 |
| | 32.60 | 6.52 | 450 |
| | 30.95 | 6.19 | 860 |
| 3003 | 19.00 | 3.80 | 10 |
| | 27.95 | 5.59 | 450 |
| | 27.60 | 5.52 | 860 |
| 5052 | 17.80 | 3.56 | 10 |
| | 30.75 | 6.15 | 450 |
| | 31.45 | 6.29 | 860 |

The above results show that adding Al to the electrolytic bath, changes coating features, e.g. the abrasion resistance and TWI of the resulting coating.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cable for power distribution applications, the cable comprising:
    a plurality of wires bundled into a cable and extending along a central longitudinal axis of the cable; the plurality of wires comprised of interior wires and peripheral wires with the peripheral wires surrounding the interior wires, at least one peripheral wire being a coated wire having deposited thereon a high emissivity coating, the high emissivity coating comprising at least one metal oxide other than aluminum oxide and at least 10 weight percent aluminum oxide, the coated wire having an emissivity greater than or equal to 0.5 and a surface area at least 20 times greater than the surface area of a bare peripheral wire prior to being coated with the high emissivity coating.

2. The cable of claim 1 wherein the interior wires and the peripheral wires comprise aluminum or an aluminum alloy.

3. The cable of claim 1 wherein the interior wires comprise a first set of interior wires and a second set of interior wires such that the second set of interior wires surrounds the first set of interior wires.

4. The cable of claim 1 wherein the high emissivity coating is homogenous.

5. The cable of claim 1 wherein the at least one metal oxide other than aluminum oxide comprises a mixture of metal oxides.

6. The cable of claim 1 wherein the coated wire coated with the high emissivity coating has an emissivity from about 0.5 to about 0.96.

7. The cable of claim 1 wherein each peripheral wire is coated with the high emissivity coating.

8. The cable of claim 1 wherein the high emissivity coating has a thickness from about 1 to 20 microns.

9. The cable of claim 1 wherein the high emissivity coating has a surface area of about 100 times greater than the surface area of the bare peripheral wire prior to being coated with the high emissivity coating.

10. The cable of claim 1 wherein the high emissivity coating has a surface area from 30 to 250 times greater than a surface area of a bare wire.

11. The cable of claim 1 wherein at least one wire has a surface roughened by knurling or rifling.

12. The cable of claim 1 wherein the high emissivity coating comprises an oxide selected from the group consisting of titanium oxide, zirconium oxide, hafnium oxide, tin oxide, germanium oxide, boron oxide, iron oxides, copper oxides, manganese oxides, cobalt oxides, cerium oxides, molybdenum oxides, tungsten oxides, yttrium oxides, bismuth oxides, zinc oxide, vanadium oxides and combinations thereof.

13. The cable of claim 1 wherein the high emissivity coating is an electro-ceramic coating.

14. The cable of claim 13 wherein the high emissivity coating is formed by a method comprising:
    contacting a bare wire with a bath containing an aqueous solution with a precursor for the electro-ceramic coating;
    operating an electrification device in electrical communication with the bare wire to electrify the bare wire with a high voltage and a high current; and
    electrochemically reacting the bare wire with the precursor in the bath to deposit the high emissivity coating on an outer surface of the wire thereby producing a coated wire.

15. The cable of claim 1 wherein the at least one metal oxide other than aluminum oxide an oxide mixture comprises a first oxide and a second oxide, the first oxide and the second oxide each independently selected from the group consisting of titanium oxide, zirconium oxide, hafnium oxide, tin oxide, germanium oxide, boron oxide, iron oxides, copper oxides, manganese oxides, cobalt oxides, cerium oxides, molybdenum oxides, tungsten oxides, yttrium oxides, bismuth oxides, zinc oxide, and vanadium oxides.

16. The cable of claim 15 wherein the high emissivity coating comprises domains of the first oxide and domains of the second oxide.

17. The cable of claim 1 wherein the high emissivity coating comprises a plurality of pores, at least some of the plurality of pores having high emissivity particles physically incorporated therein.

18. The cable of claim 17 wherein the high emissivity particles are selected from particles of carbon black, lamp black, graphite, graphene, graphene oxide, copper sulfide, MnO.

19. A cable for power distribution applications, the cable comprising:
    a plurality of wires bundled into a cable and extending along a central longitudinal axis of the cable; the plurality of wires comprised of interior wires and peripheral wires with the peripheral wires surrounding the interior wires, at least one peripheral wire being a coated wire having deposited thereon a high emissivity electro-ceramic coating comprising at least one of titanium oxide and zirconium oxide; and at least 10 weight percent aluminum oxide, the coated wire having an emissivity greater than or equal to 0.5 and a surface area at least 100 times greater than the surface area of a bare peripheral wire prior to being coated with the high emissivity coating.

20. The cable of claim 19 wherein the coated wire coated with the high emissivity coating has an emissivity from about 0.5 to about 0.96.

21. The cable of claim 19 wherein the high emissivity coating has a thickness from 1 to 20 microns.

22. The cable of claim 21 wherein the high emissivity coating comprises a plurality of pores, the plurality of pores having graphite disposed therein.

23. The cable of claim 19 wherein the high emissivity electro-ceramic coating comprises titanium oxide and zirconium oxide.

24. The cable of claim 19 wherein the high emissivity coating has a surface area of about 700 times greater than the surface area of the bare peripheral wire prior to being coated with the high emissivity coating.

25. A coated wire comprising:
    a metal wire; and
    a coating chemically adhered directly on the metal wire, the coating comprising at least one metal oxide other than aluminum oxide and at least 10 weight percent aluminum oxide, the coating having an emissivity greater than or equal to 0.5 and a surface area at least 20 times greater than the surface area of a bare wire prior to being coated with the coating.

26. The coated wire of claim 25 wherein the coating is an electro-ceramic coating and the at least one metal oxide other than aluminum oxide is selected from titanium oxide, zirconium oxide and combinations thereof.

* * * * *